United States Patent Office 3,207,797
Patented Sept. 21, 1965

3,207,797
α-FLUOROSTYRENE
John A. Sedlak, Stamford, George C. Gleckler, Springdale, and Ken Matsuda, Stamford, Conn., assignors to American Cyanamid Company, Stamford, Conn., a corporation of Maine
No Drawing. Filed Apr. 20, 1962, Ser. No. 188,973
3 Claims. (Cl. 260—651)

This invention relates to a process for preparing α,α-difluoroethylbenzene and converting said compound to α-fluorostyrene by a thermal cracking step. More particularly this invention relates to the process of reacting phenylacetylene with hydrogen fluoride to produce α,α-difluoroethylbenzene and cracking said fluoroethylbenzene to produce α-fluorostyrene. Still further this invention relates to α-fluorostyrene, a novel vinyl monomer.

One of the objects of the present invention is to produce α-fluorostyrene. A further object of the present invention is to produce α,α-difluoroethylbenzene by reacting phenylacetylene with hydrogen fluoride followed by the subsequent thermal cracking of the α,α-difluoroethylbenzene to produce α-fluorostyrene. These and other objects of the present invention will be discussed in greater detail hereinbelow.

The process for preparing α-fluorostyrene according to the concept of the present invention may be accomplished in two essential steps, separately or continuously. In the first step the α,α-difluoroethylbenzene is prepared by reacting 1 mole of phenylacetylene with at least 2 moles of hydrogen fluoride. The upper limit of the number of moles of hydrogen fluoride to be used is not critical but for practical purposes it should not exceed about 8 moles of hydrogen fluoride per mole of phenylacetylene. Preferably one would use 1 mole of phenylacetylene per 3 to 6 moles of hydrogen fluoride. This process for preparing α,α-difluoroethylbenzene is carried out in the presence of a catalytic material comprising mercuric oxide carried on an activated charcoal base or substrate. This catalytic material is well known in the art and is disclosed in significant detail in the U.S. Patent No. 2,455,881 which is incorporated herein by reference in order to avoid unnecessary repetition of the knowledge of the prior art. This process is generally and preferably carried out in the vapor phase by passing the two reactants into a heated reaction vessel or column containing the mercuric oxide impregnated activated charcoal at temperatures varying between about 100° C. and 200° C. Preferably the temperature in the reaction vessel is maintained at about 140–160° C. It is therefore preferred that the reactants entering into the reaction vessel are subjected to a preheating treatment in order that they be ready for interreaction upon entry into the reaction vessel. Alternatively, the process of the present invention can be carried out in a batch operation by reacting the phenylacetylene and hydrogen fluoride in a solvent such as diethyl either at about 0° C. The amount of the mercuric oxide which is deposited on or impregnated into the activated charcoal will follow conventional amounts and will be between 5% and 25% by weight of mercuric oxide based on the total weight of mercuric oxide and activated charcoal. Preferably the amount of mercuric oxide will be between about 12% and 16% by weight, same basis. When a continuous vapor phase technique is used, in keeping with the concept of the present invention, the space velocity of the mixture of gases entering into the reaction vessel will be about 200–1000 liters per hour per liter of volume of the catalyst and preferably about 500–700 liters per hour per liter volume. Generally when the intermediate α,α-difluoroethylbenzene is produced there will be contained therein additionally some unreacted hydrogen fluoride, some minor amounts of unreacted phenylacetylene, some minor amounts of α-fluorostyrene together with small amounts of impurities. This total mixture should be passed through an aqueous solution of a basic material such as sodium hydroxide, potassium hydroxide, ammonium hydroxide and the like in order to neutralize the hydrogen fluoride by converting the same to the corresponding fluoride salt. This neutralization step is best accomplished by bubbling the effluent gases upwardly through the aqueous solution of the basic material. Thereupon the effluent gases emerging from the aqueous basic solution are passed through an inert organic solvent material such as benzene, toluene, xylene, ethylbenzene, mineral spirits and the like. This organic solvent solution is then distilled so as to produce the α,α-difluoroethylbenzene.

If the percentage of α,α-difluoroethylbenzene in the ultimate reaction product of the first step is satisfactorily high and the amount of organic impurities is comparatively low, no fractional distillation step need be entertained. On the other hand, if the amount of the organic side reaction products and of unreacted phenylacetylene is comparatively high, a fractional distillation step may be considered necessary.

In the second step of the process for producing α-fluorostyrene, the α,α-difluoroethylbenzene is passed through a stainless steel or nickel reaction vessel. The metallic reaction vessels are used purposely because they apparently function as catalytic materials to enhance the yield of α-fluorostyrene produced in the thermal cracking step. After some considerable useage the inner walls of the stainless steel or nickel reaction vessel become coated with a film which prevents the surface from making contact with the reactants and the yield of α-fluorostyrene begins to diminish. When this drop in yield becomes significant, the process should be interrupted and the inner side walls of the reaction vessel should be cleaned. The cracking step can be further enhanced by placing within the reaction vessel baffle plates arranged horizontally so as to provide trays for the deposit of catalytic quantities of finely divided particles of stainless steel or nickel. This, together with the walls of the reaction vessel, enhances the yield significantly. The temperature in the thermal cracking vessel should be maintained between about 250° C. and 700° C. and preferably between 350° C. and 550° C. This cracking step results in the release of hydrogen fluoride which is a contaminant which needs to be removed from the effluent gases emerging from the cracking vessel. As a consequence, these effluent gases should be bubbled upwardly through an aqueous solution of a basic material in much the same manner as in step 1. Thereupon the gases emerging from the aqueous basic solution may be absorbed into an inert organic solvent as in step 1 and distilled to produce a substantially pure α-fluorostyrene. The space velocity through the cracking vessel may be varied from about 10 liters of gas (S.T.P.) per liter volume of the pyrolysis zone per hour to about 50 liters of gas and preferably about 20 to 30 liters of gas per liter volume of pyrolysis zone per hour.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

*Example 1*

A reaction tube containing mercuric oxide impregnated on granular (4–8 mesh size) activated charcoal is swept with dry nitrogen and then with anhydrous hydrogen fluoride. 147.3 parts (1.441 moles) of vaporized phenylacetylene together with 5.41 moles of anhydrous hydrogen fluoride and 1.77 moles of dry nitrogen are passed at a constant rate through the reactor over a period of 185 minutes. At the beginning of the period the temperature at the top of the catalyst bed is 136° C. and the maximum temperature during the reaction is 172° C. The effluent stream is passed through a scrubber containing 150 parts of n-hexane and 1400 parts of an aqueous solution of 450 parts of potassium hydroxide. The effluent emerging from the scrubber is then passed through a trap cooled in Dry Ice and acetone. After the phenylacetylene addition is complete, the apparatus is swept again with nitrogen. The contents of the scrubber and the cold trap are combined. The organic layer is separated and washed three times with saturated aqueous potassium chloride solution made slightly basic with ammonium hydroxide. The resultant organic layer is then dried over anhydrous magnesium sulfate. The drying agent is filtered and the n-hexane is removed by distillation at 140 mm. pressure. The residue is distilled through a Widmer glass-spiral column to give 90.3 parts of distillate having a boiling point of 64–67° C. at 48 mm. Vapor phase chromatographic analysis showed that the distillate consisted of 4.2 parts (0.041 mole) of $C_6H_5C \equiv CH$ and 86.1 parts (0.606 mole) of $C_6H_5CF_2CH_3$. The conversion of $C_6H_5C \equiv CH$ was 97.2% and the yield of $C_6H_5CF_2CH_3$ was 43.3%.

*Example 2*

The α,α-difluoroethylbenzene produced in Example 1 is passed at a constant rate through a preheater maintained at approximately 200° C. with a diluent of dry nitrogen gas into a stainless steel reactor heated at 500° C. The total time elapsed for passage through the reactor is 106 minutes. The effluent stream emerging from the reactor is cooled to about 50° C. and passed through a scrubber containing 35 parts of benzene and an aqueous solution of 56 parts of potassium hydroxide in 125 parts of water. The effluent is then passed through a trap cooled in Dry Ice and acetone. After the α,α-difluoroethylbenzene addition is complete, the nitrogen gas flow and temperatures are maintained for an additional 30 minutes. The contents of the scrubber and cold trap are combined. The organic layer is separated and washed three times with a saturated aqueous potassium chloride solution made slightly basic with ammonium hydroxide. The resultant product is then dried over magnesium sulfate containing a hydroquinone inhibitor to prevent polymerization under the conditions of drying. The drying agent is filtered and the benzene is removed by distillation at 140 mm. of pressure. The residue amounted to 27.7 parts, which according to vapor phase chromatographic analysis consisted of 12.2 parts of α,α-difluoroethylbenzene, 14.5 parts of α-fluorostyrene, and 1 part of phenylacetylene. The conversion of the α,α-difluoroethylbenzene is 69%. The yield of α-fluorostyrene is 61% and the yield of phenylacetylene is 5%. The α-fluorostyrene is obtained from the product mixture by chromatography on basic activated alumina. N-hexane eluted the α-fluorostyrene before the α,α-difluoroethylbenzene or phenylacetylene. After removing the n-hexane by distillation, the α-fluorostyrene (inhibited with hydroquinone) is distilled at 69.1–69.4° C. at 48 mm.

*Analysis.*—Calculated for $C_8H_7F$: C, 78.69; H, 5.78; F, 15.56. Found: C, 7.57; H, 5.73; F, 15.54.

Infrared and mass spectrometric spectra were consistent with the structure of α-fluorostyrene. Further structure proof was provided by acidic hydrolysis of the product to yield acetophenone.

*Comparative example*

Into a suitable reaction vessel equipped with stirrer, thermometer, and a cooling bath there is introduced a solution of 80 parts of anhydrous hydrogen fluoride dissolved in 105 parts of anhydrous diethyl ether. While maintaining the temperature at about 0° C. there is added 25.5 parts of phenylacetylene in uniform small increments over a 1 hour period by constantly stirring the hydrogen fluoride solution in the reaction vessel. After the addition is completed the stirring is continued for an additional hour. Thereafter, 75 parts of anhydrous diethyl ether is added and the total blend is poured into a mixture of 200 parts of cracked ice and 100 parts of water. The resulting mixture is cooled and stirred with sufficient potassium carbonate solution in order to make the aqueous phase basic. The ether layer is then separated from the aqueous layer and dried over anhydrous magnesium sulfate. After the drying agent is filtered and ether removed by distillation on a steam bath, the residue is distilled to give 6.3 parts of α,α-difluoroethylbenzene having a boiling point of 64.6° C. at 40 mm. The yield of α,α-difluoroethylbenzene is 18%.

*Analysis.*—Calculated for $C_8H_8F_2$: C, 67.61; H, 5.67; F, 26.74. Found: C, 67.94; H, 5.70; F, 27.08.

The infrared and mass spectrometric spectra were consistent with the structure of α,α-difluoroethylbenzene. Further structure proof was provided by acidic hydrolysis to yield acetophenone.

The α-fluorostyrene of the present invention is a polymerizable monomer which may be utilized for the preparation of polymeric materials which are useful as molding composition, laminating compositions, coating compositions, adhesives and the like. Greater details relating to the polymerization step will be found in the application of James S. Noland having the Serial No. 188,954, filed April 20, 1962, entitled Polymer and Process of Preparing the Same.

We claim:

1. A process for preparing α,α-difluoroethylbenzene comprising reacting in the vapor phase 1 mole of phenylacetylene with between 2 and 8 moles of hydrogen fluoride at a temperature between about 100° C. and 200° C. in the presence of a catalyst comprising mercuric oxide on activated charcoal, passing the resultant reaction product through an aqueous solution of a basic material and then into an organic solvent and distilling off the solvent and resulting α,α-difluoroethylbenzene.

2. A process for preparing α-fluorostyrene comprising reacting in the vapor phase 1 mole of phenylacetylene with between 2 and 8 moles of hydrogen fluoride at a temperature between about 100° C. and 200° C. in the presence of a catalyst comprising mercuric oxide on activated charcoal, passing the resultant reaction product through an aqueous solution of a basic material and then into an organic solvent and distilling off the solvent and resulting α,α-difluoroethylbenzene, passing the α,α-Difluoroethylbenzene through a reaction vessel made of a metal selected from the group consisting of stainless steel and nickel at a temperature between 250° C. and 700° C. in order to thermally crack the α,α-difluoroethylbenzene to produce α-fluorostyrene.

3. α-Fluorostyrene.

References Cited by the Examiner

UNITED STATES PATENTS

| 2,519,199 | 8/50 | Salisbury | 260—653.6 X |
| 2,612,528 | 9/52 | Cohne | 260—650 |
| 2,651,627 | 9/53 | Prober | 260—650 |

FOREIGN PATENTS

| 619,394 | 3/49 | Great Britain. |

OTHER REFERENCES

Nad' et al.: "Izvestiya Akademii nauk U.S.S.R.," No. 2, pages 272 to 277 (1959).

LEON ZITVER, *Primary Examiner.*

UNITED STATES PATENT OFFICE
CERTIFICATE OF CORRECTION

Patent No. 3,207,797                        September 21, 1965

John A. Sedlak et al.

It is hereby certified that error appears in the above numbered patent requiring correction and that the said Letters Patent should read as corrected below.

Column 3, line 67, for "C, 7.57" read -- C, 78.57 --.

Signed and sealed this 5th day of April 1966.

(SEAL)
Attest:

ERNEST W. SWIDER                            EDWARD J. BRENNER
Attesting Officer                                Commissioner of Patents